INVENTOR.
THOMAS F. BURKE
BY
Howard G. Russell
his ATTORNEY

June 3, 1958

T. F. BURKE 2,837,014

DEVICE FOR FOLDING AND INSERTING LINERS INTO FOLDING BOX SHELLS

Filed April 20, 1955

INVENTOR.
THOMAS F. BURKE
BY Howard G. Russell
his ATTORNEY

T. F. BURKE 2,837,014

DEVICE FOR FOLDING AND INSERTING LINERS INTO FOLDING BOX SHELLS

Filed April 20, 1955

INVENTOR.
THOMAS F. BURKE
BY
Howard G. Russell
his ATTORNEY

June 3, 1958  T. F. BURKE  2,837,014
DEVICE FOR FOLDING AND INSERTING LINERS INTO
FOLDING BOX SHELLS
Filed April 20, 1955  8 Sheets-Sheet 5

INVENTOR.
THOMAS F. BURKE
BY
Howard G. Russell
his ATTORNEY

T. F. BURKE 2,837,014

DEVICE FOR FOLDING AND INSERTING LINERS INTO FOLDING BOX SHELLS

Filed April 20, 1955

INVENTOR
THOMAS F. BURKE
BY
Howard G. Russell
his ATTORNEY

United States Patent Office 2,837,014
Patented June 3, 1958

2,837,014

DEVICE FOR FOLDING AND INSERTING LINERS INTO FOLDING BOX SHELLS

Thomas Francis Burke, Redwood City, Calif., assignor, by mesne assignments, to Baljak Corporation, Wilmington, Del., a corporation of Delaware Application April 29, 1955, Serial No. 502,660

8 Claims. (Cl. 93—36.01)

This invention relates to the art of assembling lined folding boxes by automatic high speed machinery. More specifically, the invention provides an automatic device for folding liner blanks into box-like shape and inserting the folded liners into previously, and independently, assembly box shells.

The liner may be of the flat-sheet type and may consist of paper, metal foil or plastic material. The liner may also be of the corrugated type and may consist in part, or entirely, of paper, metal foil or plastic sheet material. A corrugated liner may be of single face or double face construction.

With respect to the corner construction, the liner may have open corners, in which event the box portion of the liner has roughly the shape of a common cross. If a certain overlap is desired at the corners, the liner blank may have the shape of a Maltese cross. If the corners of the liner are to be liquid or sift-tight, it may be provided with gusset or bellows corners.

The box shell may be of conventional glued construction but may also be of the self locking glueless type. The box shell may be assembled by the same machine which forms or inserts the liner or it may be assembled by an entirely separate machine and moved to the liner machine by a conveyor.

The invention also provides numerous improvements pertaining to the handling of liner material, for example improvements which insure perfect shaping and inserting of the liner, and it provides improved and advantageous elements for handling and shaping the flexible and foldable sheet material in the course of its conversion from flat blank form into hollow box-like shape.

The various objects, features and advantages of the invention will appear more fully from the detailed description which follows accompanied by drawings showing, for the purpose of illustration, the application of the invention to a machine which sets up a box shell of self-locking, glueless construction, and, in a tandem operation, forms a corrugated liner of the gusset corner type, and then combines both box shell and liner. However, it will become apparent that the box shell may be assembled by an entirely separate machine and conveyed to the liner folding and inserting machine by a suitable conveyor. In either event the machine incorporating the present invention produces a lined box ready for filling and closing. The invention also resides in certain new and original features of construction and combination of elements hereinafter set forth and claimed.

Although the characteristic features of this invention which are believed to be novel will be particularly pointed out in the claims appended hereto, the invention itself, its objects and advantages, and the manner in which it may be carried out may be better understood by referring to the following description taken in connection with the accompanying drawings forming a part of it, in which:

Figs. 1 to 13 are perspective views of a machine incorporating the present invention, the views illustrating successive stages in the operation, more particularly;

In the following description and in the claims various details will be identified by specific names for convenience. These names are intended to be generic in their application. Corresponding reference characters refer to corresponding parts in the several figures of the drawings.

The drawings accompanying and forming part of this specification disclose certain specific details of the invention for the purpose of explanation of broader aspects of the invention, but it is understood that the details may be modified in various respects without departure from the broad principles of the invention, and that the invention may be applied to other structures than the one shown.

The machine in which the invention is incorporated is a folding box machine of the plunger-and-die type comprising a folding die and plunger assembly for setting up self-locking boxes in which the corners of the box blank are mechanically interlocked without the use of additional fastening means, such as adhesive or staples.

The prior patent to Thomas R. Baker and Frank M. Lefief, No. 2,655,843, dated October 20, 1953, discloses such a machine in detail. The machine comprises basically a blank magazine, a folding die, a plunger movable through the die, a mechanism for feeding blanks from the magazine to the folding die, and a supporting framework within which the various elements of the machine are mounted. The machine illustrated in the accompanying drawings differs from the machine illustrated in the aforementioned Patent No. 2,655,843 in that two magazines, two dies and two plungers are employed, mounted in tandem arrangement. The two magazines and folding dies are served by a joint feeder mechanism which carries blanks from both magazines to both dies simultaneously.

Figure 1:
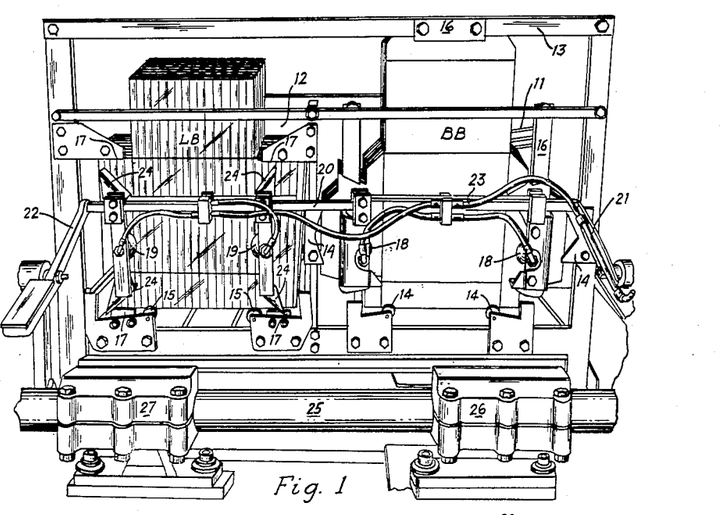
Fig. 1 is an elevational perspective view of the two blank magazines of the machine from which blanks are withdrawn by a joint feeder.

Referring to Figure 1 a box blank magazine 11 and a liner blank magazine 12 are mounted in a common frame 13. The box blanks BB and the liner blanks LB rest on rods 14 and 15 and are prevented from falling out of the magazines in the direction of the observer by gate elements 16 and 17 which overlap marginal portions of the blanks and retain the blanks in the magazine unless the blanks are slightly flexed and pulled past the retaining gate elements by the feeder.

Details of a blank feeding mechanism of the general type illustrated in the accompanying drawings are disclosed in the prior patent to Baker and Pagendarm, No. 2,624,249, issued January 6, 1953. The feeding mechanism basically comprises one or a plurality of vacuum powered suction cups which are moved by a mechanical mechanism in such a way as to pick up indivdual blanks at the magazine gate, withdraw them past the retaining overlapping elements of the gate, and move them along a prescribed and controlled path to a predetermined position on the folding die where the blanks are deposited.

In the illustrated form of feeding mechanism suction cups 18 for handling box blanks and suction cups 19 for handling liner blanks are mounted on a common bar 20. The ends of the bar 20 are secured to arms 21 and 22 of the actuating mechanism which moves the suction cups from a pick-up position in front of the magazines to a deposit position on the folding dies. The dies are not visible in this figure. A typical actuating mechanism is disclosed in the aforementioned Patent 2,624,249 and an improved mechanism for high speed operation is disclosed in the patent to Frank M. Lefief, No. 2,805,060, dated September 3, 1957 (application Serial No. 501,462, filed April 15, 1955.)

The suction cups are connected by flexible ducts 23 to a suitable source of low pressure, for example a vacuum pump.

The blank BB is of the self-locking type and corresponds essentially to the style of blank disclosed in the aforementioned Patent 2,655,843. A detailed description of the blank can therefore be dispensed with.

The liner blank LB comprises wall panels which correspond in size to the wall panels of the box shell, and is characterized by bellows or gusset corners. In Figure 1 gusset folding guides 24 engage the liner blank adjacent the diagonal gusset fold lines of the corner structure. The purpose of these folding guides will later become apparent.

In the foreground of Figure 1 a mounting bar 25 is visible on which blank shaping plungers are mounted by means of clamps 26 and 27. The bar 25 is mounted in the machine for reciprocating movement in a substantially vertical plane.

Figure 2:
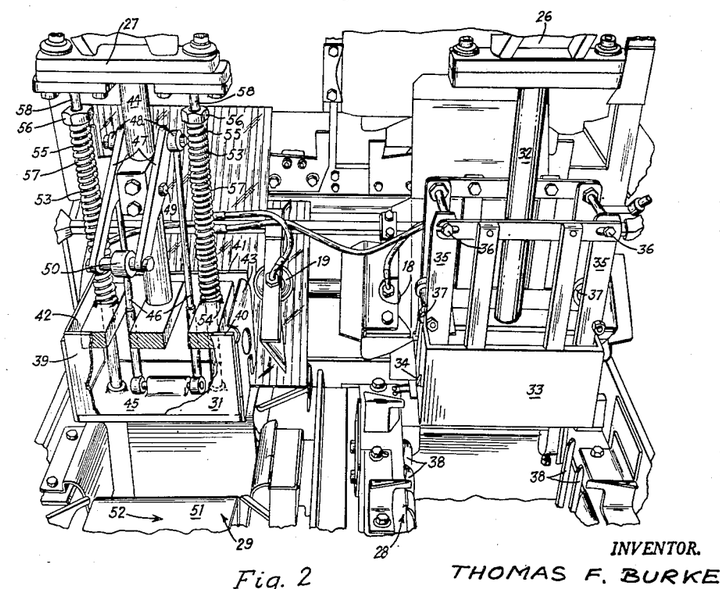
Fig. 2 is a view of the feeding mechanism, two plungers and the two folding dies, the feeder being approximately in the half-way position between the magazines and the dies.

After contact of the suction cups 18 and 19 with the respective blanks, the blanks are grasped by the cups and are removed from the magazines in the direction of the folding dies 28 and 29 visible in Figure 2. Figure 2 shows the blanks in approximately the half-way position between the magazines and the dies. At this instant the box plunger 30 and the liner plunger 31 are being retracted from the respective dies and are moving in an upward direction.

The box plunger 30 comprises a stem 32 extending from the clamp 26 to the plunger body 33. The plunger body 33 is provided with movable hook-shaped locking elements 34 which normally protrude beyond the end walls of the plunger body and may be retracted to the inside of the plunger body by the arms 35 on which they are mounted. The arms 35 are hingedly supported at 36 and carry rollers 37 which strike cam elements 38 in the die with the result that the arms 35 are swung inwardly against the action of biasing springs (not visible) which tend to move the arms in the opposite direction. Details of the construction of the plunger 33 and details of the die 28 are illustrated and described in the patent to Pagendarm, No. 2,580,189, of December 25, 1951.

The liner plunger 31 also has a body 39 comprising side walls 40, 41 and end walls 42 and 43. The body 39 of the plunger is mounted on a stem 44 extending from the mounting clamp 27. The plunger has a bottom plate 45 which is projectible beyond the plunger body 39 by means of push rod 46 linked to a double armed lever 47 at 48. The lever 47 is pivotally mounted at 49 and its other end carries a roller 50 which strikes a plate 51 at the point 52 after the plunger 31 has entered the die 29. The bottom plate 45 has two tubular stems 53 secured to it. These stems extend through bores 54 in the plunger body, and the upper ends of the stems 53 are threaded at 55 and carry nuts 56. Compression springs 57 bear with their lower ends against the body structure 39 and with their upper ends against the nuts 56 thus tending to pull the bottom plate 45 against the plunger body 39. Projection of the bottom plate 45 by the aforedescribed lever mechanism 46, 47, 50, causes further compression of the springs 57. During this movement the tubular stems 53 moves freely within the bores 55 and are additionally guided by guide rods 58 extending into the interior of the hollow stems.

Figure 3:
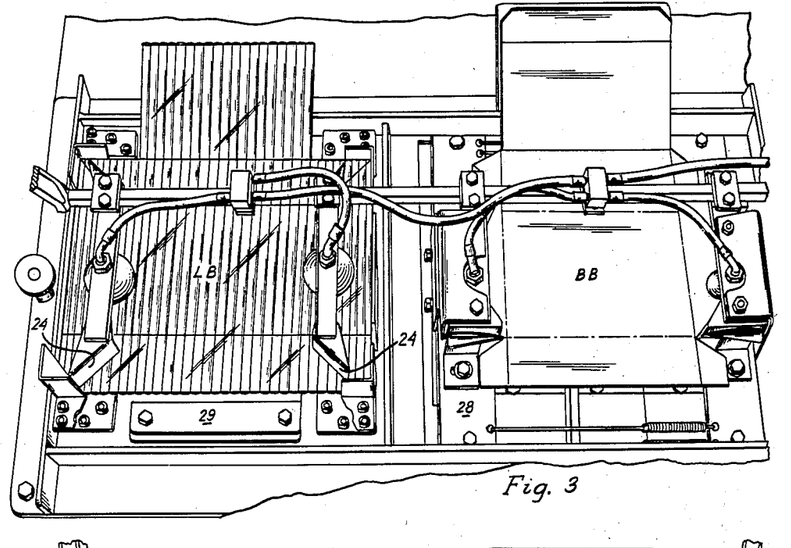
Fig. 3 is essentially a perspective top view of the feeder at the instant of deposition of the blanks on the dies.

Figure 3 illustrates the feeder mechanism in the position in which it deposits the blanks BB and LB on the dies 28 and 29. At this point the suction is relieved so that the blanks are not disturbed by the return movement of the suction cups.

When the feeder deposits the liner blank on the die, its gusset folding guides 24 cause the blank to be creased slightly at the diagonal fold lines of the corner gussets. This is accompanied by interaction of the folding guides 24 with corresponding rules or edges 59 on the die. These are clearly visible in Figure 16. Pre-breaking or pre-creasing of the diagonal gusset folds insures correct folding of the gussets by the liner plunger.

Figure 4:
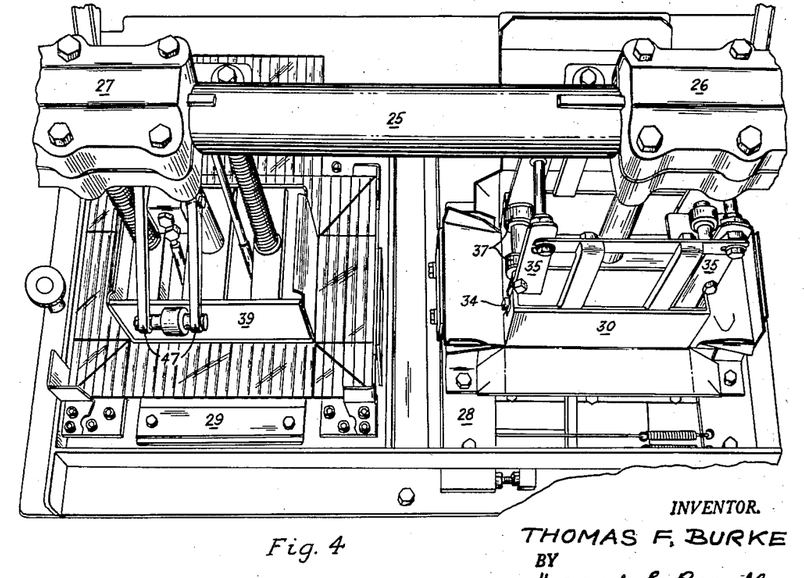
Fig. 4 shows the two plungers at the instant of engagement with the blanks after withdrawal of the feeder.

As the suction feeder is being withdrawn, the two plungers descend and strike the two blanks to force the blanks into and through the throat of the dies 28 and 29. Figure 4 illustrates this phase of the assembly operation.

As the plungers 30 and 31 enter the respective dies 28 and 29, the end panels of the box blank are folded into upright position in the manner described and illustrated in great detail in the aforementioned Patent 2,655,-843. The details of this assembly operation are readily understood from the accompanying drawings and have, in addition, become well known in the art by this time. It is therefore not necessary to describe all the details of the folding and locking operations performed on the box blank.

Figure 5:
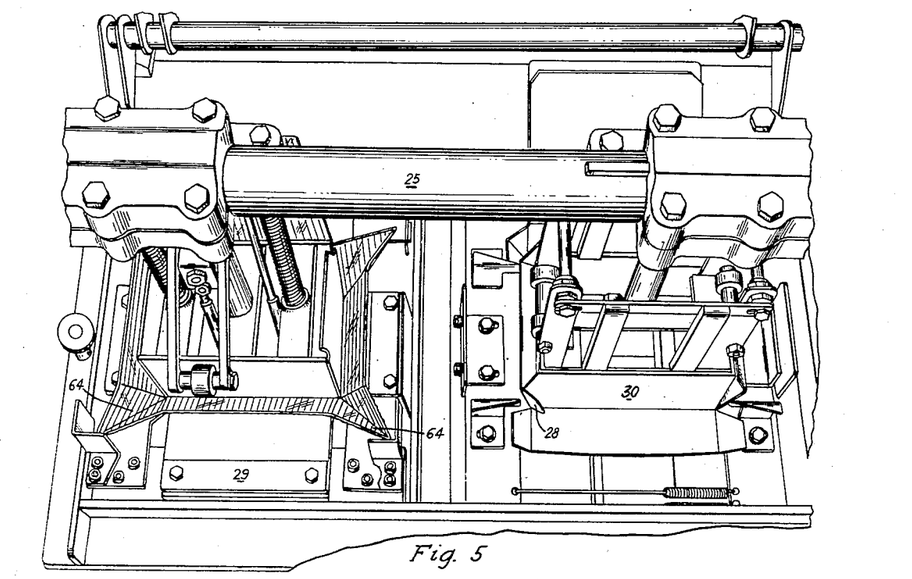
Figs. 5 and 6 show successive stages in the folding of the blanks by the plungers entering the dies.
Figure 16:
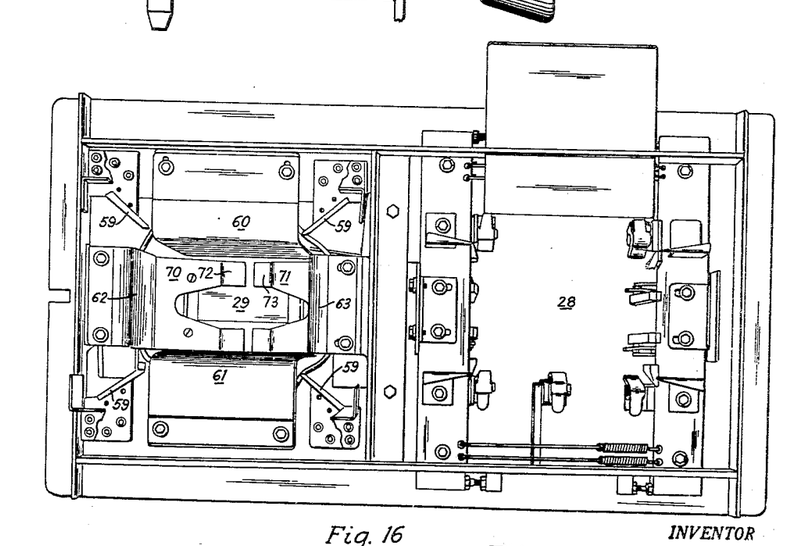
Fig. 16 is essentially a top view of the two folding dies removed from the machine.

Turning to the liner blank, the side panels of the liner blank are folded into upright position by the side wall members 60 and 61 of the liner die 29 and the end panels of the liner blank are folded into upright position by the end wall members 62 and 63 of the liner die (see Figure 16). The folding of the side panels and end panels of the liner causes the corner portions of the blank to fold into gussets 64 (see Figure 5).

Figure 6:
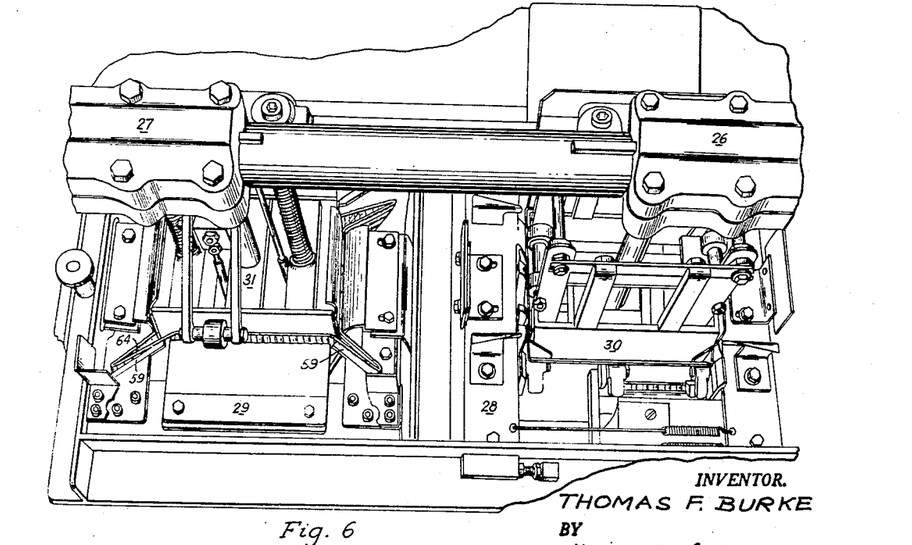

Figure 6 shows the plungers and dies in a position in which the corner gussets 64 are practically flat and the side panels and end panels of the liner blank are fully upright. At this point the gussets strike folding guides 65. These folding guides are visible in Figure 7 and extend from a position outside the side wall members 60 and 61 of the die in a continuous curve downwardly into a position closely adjacent to the path of the liner plunger. The gusset folding guides 65 cause the corner gussets to swing over the erected end panels of the liner. This involves a motion of the gusset panels through an arc of approximately 135 degrees.

Figure 7:
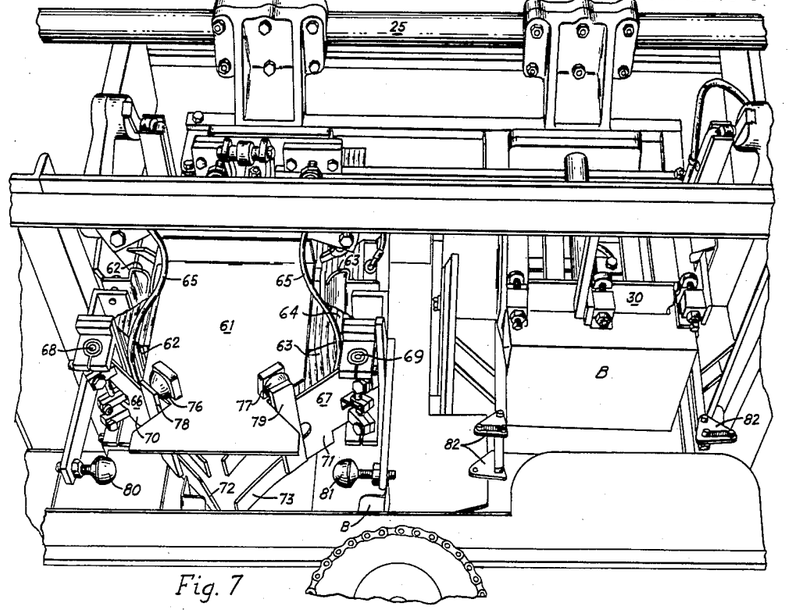
Figs. 7 and 8 are essentially side views of the two dies, showing the plungers in two successive stages of movement.

Figure 7 illustrates the instance at which approximately half of this arc has been traversed by the gussets.

As is clearly seen from Figure 7, the side wall members 60 and 61 of the liner die are of substantial length and extend considerably below the lower edges of the shorter end wall members 62 and 63. The end wall members 62 and 63 are supplemented by hinged lower end wall engaging blades or vanes 66 and 67. These vanes are pivotally mounted on the liner die assembly at 68 and 69. The upper portions 70 and 71 of the vanes are substantially flat and lower portions 72 and 73 extend at an angle with respect to the upper portions 70 and 71, as is particularly well visible in Figures 8, 10 and 16. The purpose of this shape will presently become apparent.

Figure 10:
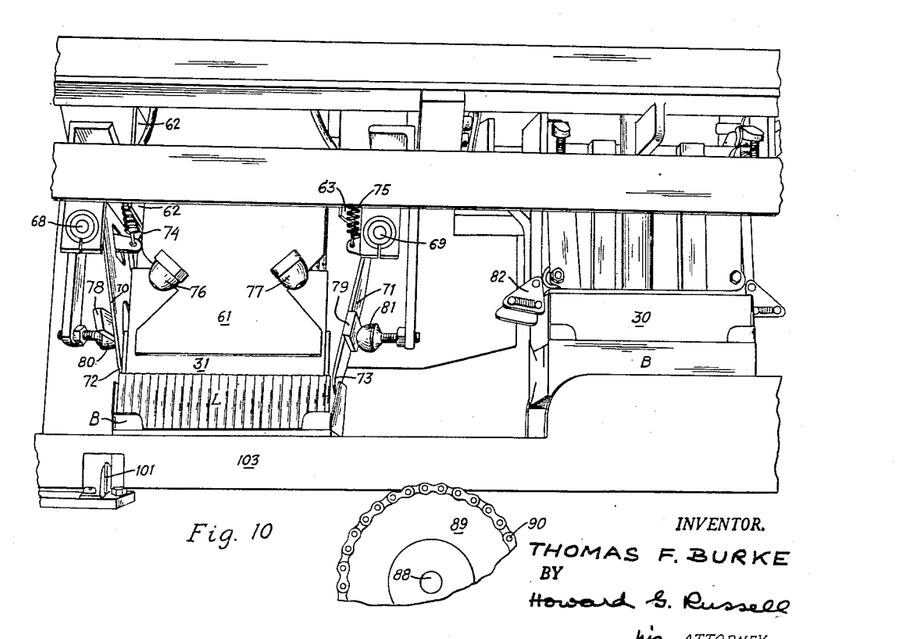
Fig. 10 is essentially a side view of the two dies, the plungers being near the lowest position of the downstroke.

The vanes are normally urged towards each other by means of springs 74 and 75 visible in Figure 10 and rest in closed position against resilient inner buffers 76 and 77 on the side wall members 60 and 61. For this purpose transverse buffer bars 78 and 79 are secured to the vanes. In fully opened position the buffer bars 78 and 79 bear against outer buffers 80 and 81 on the die assembly.

In extended position in which the vanes are shown in Figure 10 the upper portions 70 and 71 of the vanes are downwardly slanted and form a funnel-like structure, whereas the lower portion 72 and 73 of the vanes are substantially parallel and lie approximately in a continuation of the planes of the end wall members 62 and 63. This relationship is particularly well visible in Figure 10.

The fixed end wall members 62 and 63 also constitute blades over which the corner gussets are being folded by the curved gusset guides 65. As the plunger descends past the ends of the end wall members 62 and 63 of the die, the liner blank with its gussets comes under the action of the hinged vanes 66 and 67 which then press the gussets tightly against the end panels of the liner. This occurs during the phase of plunger motion following the position of Figure 7 and preceding the position of Figure 8.

At this time the box shell has been formed and the corners of the box were locked by the box plunger 30 and the box die 28 in a manner described and illustrated in detail in the aforementioned Patent 2,655,843. In the position shown in Figure 7 the assembly of the box shell is substantially complete, and the box shell is about to enter between the strippers 82 which eventually engage the top edge of the liner shell and strip it off the plunger when the plunger commences its upward stroke.

Figure 8:
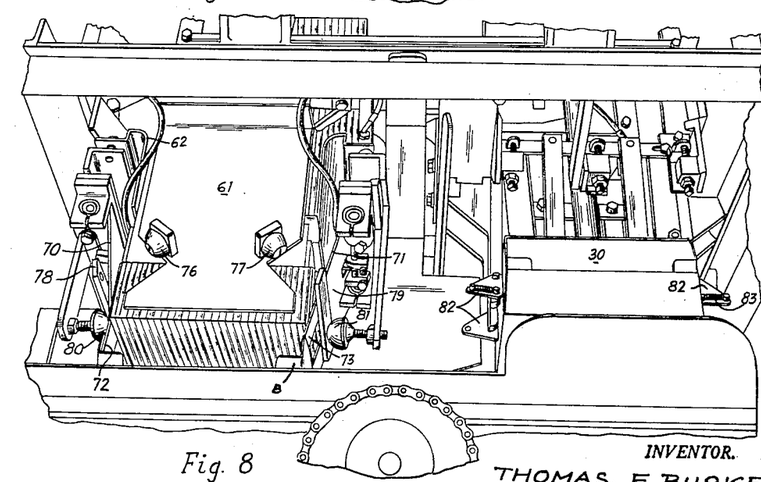

Figure 8 illustrates the position in which the strippers 82 are deflected outwardly against the action of their biasing springs 83. Figure 10 shows the position of the box in which the strippers 82 are about to engage the upper edge of the dust flaps of the box shell. At this point the plunger 30 is near its lowermost position.

Figure 9:
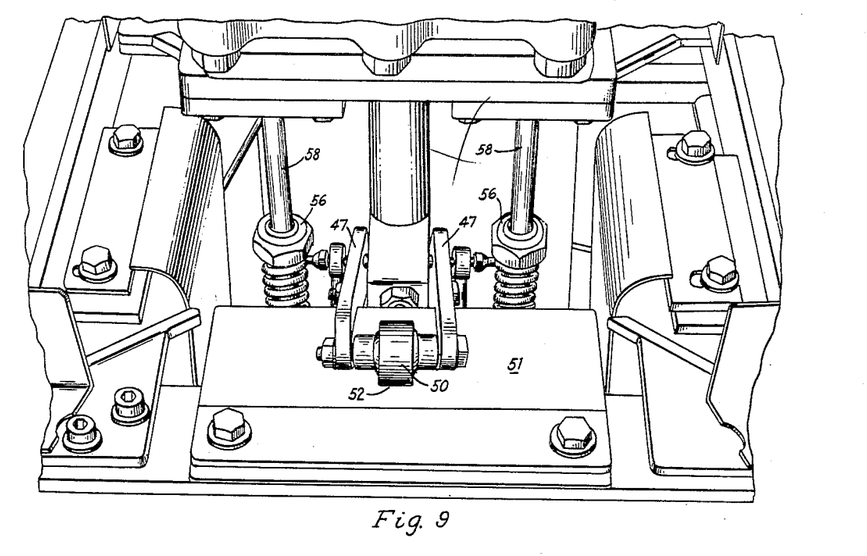
Fig. 9 is essentially a top view of the liner die illustrating the operation of the liner plunger mechanism.

As the liner plunger approaches its lowest position, the roller 50 on the double-armed actuating lever 47 for the bottom plate 45 strikes the point 52 on the side member 51 of the die and causes the bottom plate 45 to be projected beyond its normal position on the plunger body 39 (Figure 9). The bottom plate inserts the folded liner L into the completed box shell B which was moved into alignment with the path of the liner plunger in the following manner:

When the completed box shell B is stripped off the box shell plunger 30 it drops onto a conveyor running underneath the dies. This conveyor comprises essentially (Figure 14) a first conveyor chain 84 trained around sprocket wheels 85 and 86. The chain 84 preferably comprises one or several lugs 87, the number of lugs depending on the length of the chain. The sprocket wheel 85 is fast on a shaft 88 which also carries a further sprocket wheel 89. Wheel 89 forms a part of the conveyor drive. A drive chain 90 extends over the sprocket wheel 89 and over a sprocket pulley 91 on a drive shaft 92. This drive shaft is connected through suitable gears (not shown) with the remainder of the drive mechanism of the machine which also actuates the plunger and the feeder mechanism. In this manner the conveyor movement is timed with respect to the plunger and feeder movement.

Figure 14:
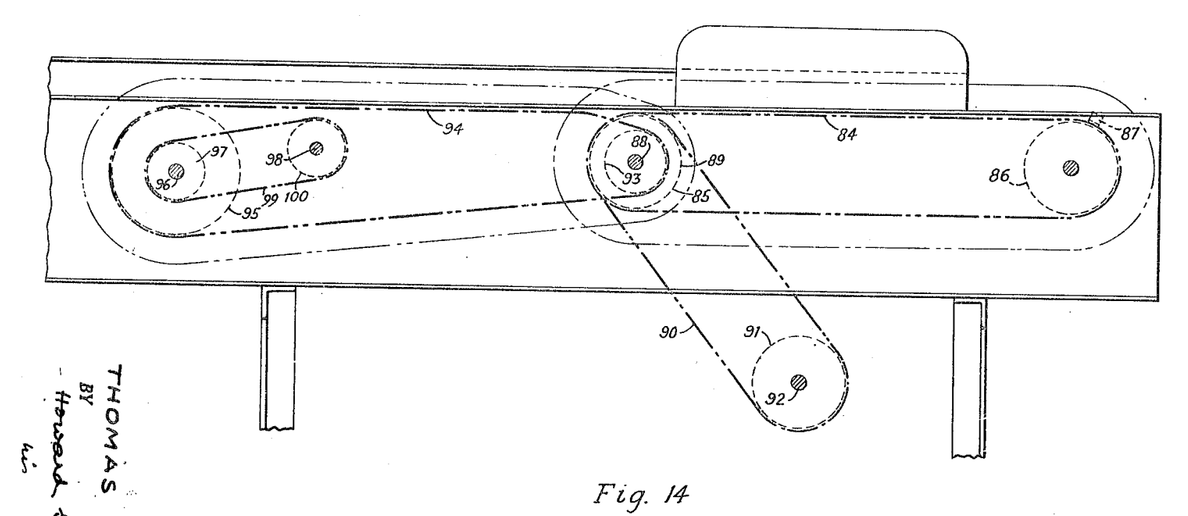
Fig. 14 is a diagrammatic view of the conveyor mechanism.

A further conveyor sprocket 93 is secured to the driven shaft 88. A second conveyor chain 94 extends over the sprocket wheel 93 and a further sprocket wheel 95 which is fast on a shaft 96 carrying also a small sprocket wheel 97. The latter drives a cam shaft 98 through a chain 99 extending over a sprocket wheel 100.

The conveyor 84 extends underneath the box shell plunger 30 and the conveyor 94 extends underneath the plunger 31 which assembles the liner.

Figure 11:
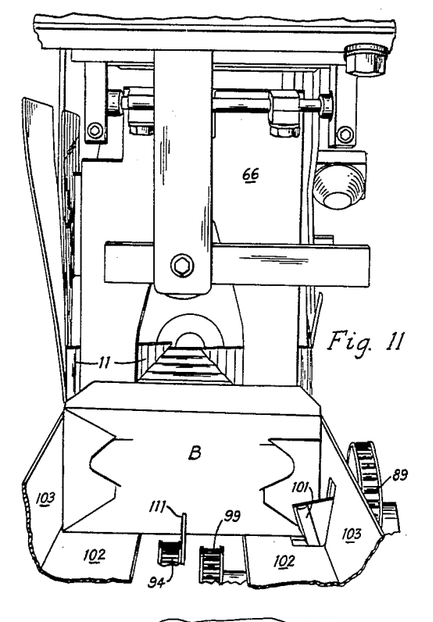
Fig. 11 is an end view of the liner die and the box conveyor, at the instant of insertion of the liner into the box shell.

When an assembled box shell is stripped off a box shell plunger 30 (Figure 10) it drops onto the conveyor 84 and is transported beyond the end of the conveyor 84 onto the second conveyor chain 94. The transport of the box by the conveyor 84 is positive by reason of the lug 87 engaging the trailing side panel of the box shell. The conveyor 84 engages the box shell and advances it until the box strikes a flag stop 101 which is moved into, and out of, the path of the boxes, as required. As shown in Figure 11, the boxes B move on a track 102 having raised sides 103, and the flag stop 101 arrests the box B on the track, if projected into the path of the box.

The flag stop is so placed with respect to the path of the liner plunger that the box comes to rest precisely underneath the stroke path of the liner plunger, so that a liner may be inserted.

Figure 15:
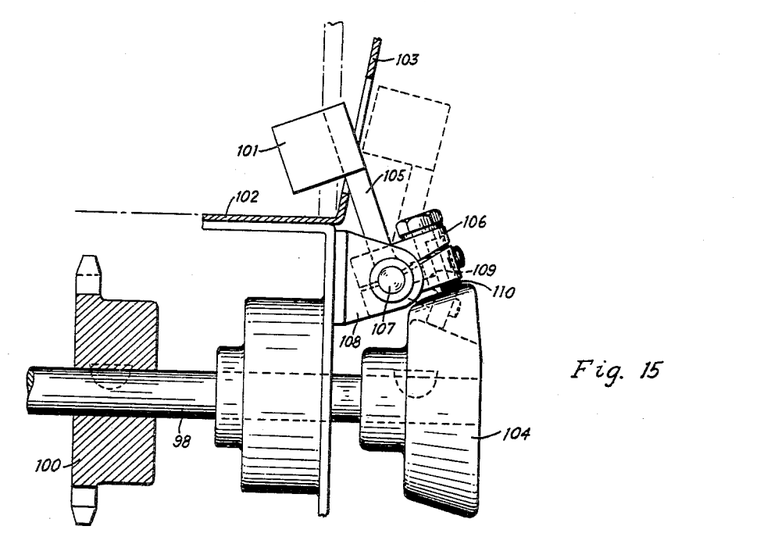
Fig. 15 is a simplified end view of the stop mechanism of the conveyor.

The mechanism for operating the flag stop is shown in Figure 15 and comprises a cam 104 on the cam shaft 98. The flag 101 is mounted on an arm 105 whose base 106 is clamped on a shaft 107. The shaft 107 is mounted in brackets of which one is visible at 108. The shaft further carries an arm 109 on which a cam follower in the form of a ball bearing 110 is mounted. The cam follower, in following the contour of the cam 104, oscillates the shaft 107 about its axis, thereby moving the flag 101 into and out of the path of the boxes. The cam follower is urged against the cam by a suitable spring (not shown).

The flag stop is moved into arresting position, and a box shell B is arrested on the conveyor 94 shortly before the vanes 66 and 67 are swung downwardly in order to engage the interior of the box shell. The vanes serve a double purpose. Firstly, they serve as a finder and positioning means for the box shell, in the event the box B has for some reason not yet reached the flag 101 of the timed stop. Secondly, the vanes prevent the corner gussets from opening up. The box liner is confined in its downward path by the long side wall members 60 and 61 of the die. These engage the side panels of the liner. The end panels of the liner are engaged by the end wall members 62 and 63 in the upper throat portion of the die and by the vanes 66 and 67 in the lower throat portion of the die.

When the liner plunger 31 approaches its lowest position, the lever mechanism 46, 47, 50 projects the bottom plate 45 of the plunger which then seats the liner in the box shell B. It is quite apparent from Figure 10 that the bottom plate of the liner plunger must for this purpose reach a position immediately above the conveyor chains in order to seat the liner L properly. This position lies a considerable distance below the lowest position reached by the box shell plunger 30 which moves only far enough to bring the top edges of the box shell B safely below the engaging edges of the strippers 82.

After insertion of the liner L into the box shell B both plungers 30, 31 are retracted. As soon as the liner plunger 31 and its bottom plate clear the lined box shell, the flag stop 101 is retracted and the conveyor chain 94 advances the box. In order to move the boxes positively, the conveyor chain 94 may be equipped with lugs. One of these lugs is visible at 111 in Figure 11. The spacing of the lugs 111 is greater than the length of the box to permit the conveyor chain 94 to move continuously during the time a box is arrested by the stop 101.

Figure 12:
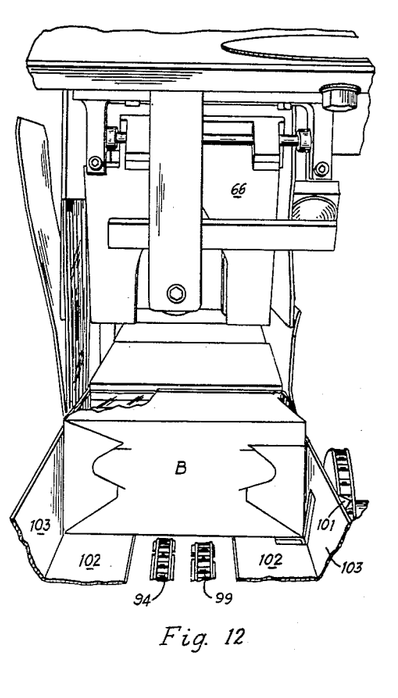
Fig. 12 is an end view of the mechanism of Figure 11 after insertion of the liner into the box shell at the instant of advance of the box by the conveyor.

Figure 12 illustrates the instance at which the box B begins to resume its travel after withdrawal of the flag stop 101. At this moment the vane 66 has just cleared the dust flaps of the box.

Figure 13:
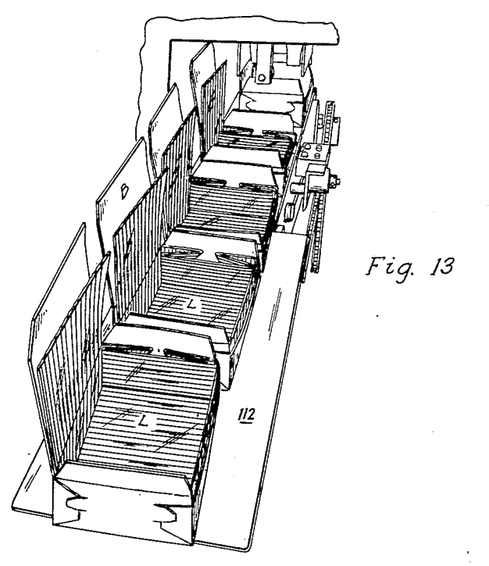
Fig. 13 is a perspective view of the conveyor portion of the machine.

Figure 13 shows an extension 112 on which the lined boxes accumulate after removal from the machine by the conveyor 94.

Obviously the present invention is equally advantageous if used in connection with glued box shells as it is with gluelessly assembled boxes.

What is claimed is:

1. A machine for forming liner blanks into box-like form and inserting such formed liners into the bodies of assembled folding boxes, the machine comprising, a liner blank magazine; a folding die; a feeder for moving liner blanks from said magazine to said folding die; a plunger movable through said folding die to fold liner blanks into box-like form, said plunger comprising a body member and a separate bottom member movable relatively to the body member; means for moving said plunger into and through said die; a conveyor for feeding folding boxes into a position underneath said die; enclosure means between said die and said conveyor for confining the formed liner, said enclosure means comprising side wall members and end wall members extending towards the conveyor, the end wall members being sufficiently short to clear boxes moving on said conveyor, the end wall members being projectible and retractable, at least in part, and sufficiently long in extended position to engage the boxes moving on said conveyor; and means operable at the end of the plunger stroke for projecting the bottom member of the plunger beyond the body member into a position adjacent said conveyor to strip the liner off the plunger and insert it into the respective folding box body.

2. A machine for forming liner blanks into box-like form and inserting such formed liners into the bodies of assembled folding boxes, the machine comprising, a liner blank magazine; a folding die; a feeder for moving liner blanks from said magazine to said folding die; a plunger movable through said folding die to fold said liner into box-like form, said plunger comprising a body member and a separate bottom member movable relatively to the body member; a conveyor for feeding folding boxes into a position underneath said die; enclosure means between said die and said conveyor for confining the formed liner against flattening out, said enclosure means comprising fixed side wall members and hingedly mounted end wall members, said end wall members being mounted on parallel hinge axes; means for urging said end wall members toward each other into closing position underneath said die in which position said end wall members clear boxes on said conveyor; means for moving said plunger into and through said die into engagement with said hinged end wall members to swing said end wall members into an open position in which they engage boxes on said conveyor; and means operable at the end of the plunger stroke for projecting the bottom member of the plunger beyond the body member of the plunger into a position sufficiently close to said conveyor to strip the formed liner off the plunger and seat it in the respective folding box body.

3. A machine for forming liner blanks into box-like form including four gusset corners folded back upon the end walls of the liner and inserting such formed liners into the bodies of assembled folding boxes, the machine comprising, a blank magazine; a folding die; a feeder comprising suction cups for moving liner blanks from said magazine to said folding die; blank creasing elements on said feeder and said die, respectively, for creasing said blank at the diagonal gusset fold lines on said die; a plunger movable through said folding die to fold said liner into box-like form, said plunger comprising a body member and a separate bottom member movable relatively to the body member; a conveyor for feeding folding boxes into a position underneath said die; enclosure means between said die and said conveyor for confining the formed liner against flattening out, said enclosure means comprising fixed side wall members and hinged end wall members, said end wall members being mounted on parallel hinged axes; means for urging said end wall members toward each other into a closing position underneath said die in which position said end wall members clear boxes on said conveyor; gusset folding guides downwardly curved from a position overlying the outside of the side wall members into a position above and inside the end wall members; means for moving said plunger into and through said die into engagement with said hinged end wall members to swing said end wall members into an open position in which they engage boxes on said conveyor; and means operable at the end of the plunger stroke for projecting the bottom member of the plunger beyond the body member of the plunger into a position below the side wall members sufficiently close to the conveyor to strip the formed liner off the plunger and seat it on the respective folding box body.

4. A structural unit for use in a machine for forming liner blanks into box-like form and inserting such formed liners into the bodies of assembled folding boxes, said unit constituting a folding die and comprising opposed stationary side wall erecting members and opposed end wall erecting members forming a substantially rectangular throat with the side wall erecting members into which a blank may be forced, each of the end wall erecting members comprising an upper stationary portion and a lower hinged portion in the form of a vane underneath and pivotally mounted about an axis substantially parallel to, and outside, the upper stationary portion; means for normally urging said vanes toward each other into closing position; stop means for limiting the opening movement of the vanes, said vanes comprising an upper portion slanted toward the center of the throat of the die and a lower portion lying at an angle to the upper portion, the lower portions of the vanes, in the position in which the vanes bear against the stops, being substantially parallel and lying substantially in the continuation of the planes of the upper fixed end members, the vanes in open position extending below the side members of the die.

5. A structural unit for use in a machine for forming liner blanks into box-like form and inserting such formed liners into the bodies of assembled folding boxes, said unit constituting a folding die and comprising opposed stationary side wall members and opposed end wall members forming, with the side wall members, a substantially rectangular throat, open at the corners, into which throat a liner blank may be forced; four substantially diagonally arranged creasing elements at the entrance of the die; said creasing elements lying outside the open corners and extending at an angle of substantially 45° with respect to the side wall members and the end wall members; the end wall members comprising an upper stationary portion and a lower hinged portion in the form of a vane pivotally mounted about an axis substantially parallel to, and outside, the upper fixed portion; means for normally urging said vanes toward each other into closing position; and blank corner folding guides extending from a position outside the side wall members in a substantially continuous curve into a position inside the hinge axes of said vanes.

6. A structural unit for use in a machine for forming liner blanks into box-like form and inserting such formed liners into the bodies of assembled folding boxes, said unit constituting a folding die and comprising opposed stationary side wall members and opposed end wall members forming, with the side wall members, a substantially rectangular throat, open at the corners, into which throat a liner blank may be forced; four substantially diagonally arranged creasing elements at the entrance of the die, said creasing elements lying outside the open corners and extending at an angle of substantially 45° with respect to the side wall members and the end wall members; the end wall members comprising an upper stationary portion and a lower hinged portion in the form of a vane pivotally mounted about an axis substantially parallel to, and outside, the upper fixed portion; means for normally urging said vanes toward each other into closing position; stop means for limiting the opening movements of the vanes; said vanes comprising an upper portion slanted towards the center of the throat of the die and a lower portion lying at an angle to the upper portion, the lower portions of the vanes, in the position in which the vanes bear against the stops, being substantially parallel and lying substantially in the continuation of the planes of the upper fixed side members, the vanes in open position extending below the side members of the die; and blank corner folding guides extending from a position outside the side wall members in a substantially continuous curve into a position inside the hinge axes of said vanes.

7. A machine for forming liner blanks into box-like form and inserting such formed liners into the bodies of assembled folding boxes, the machine comprising, a liner blank magazine; a folding die comprising upper stationary side wall engaging and end wall engaging elements and a pair of movable vanes underneath the end wall engaging elements, said vanes being projectible into, and retractable out of, the path of boxes moving on the hereinafter recited conveying means; a feeder for moving liner blanks from said magazine to said folding die; a plunger movable through said folding die to fold said liners into box-like form, said plunger comprising a body member and a separate bottom member movable relatively to the body; power means for reciprocating said plunger into and through said die; conveying means for moving folding boxes into, and from, a position underneath said die, said conveying means comprising a first feeding conveyor chain extending from one side to a point underneath, and a certain distance beyond, the stroke path of said plunger, a second conveyor chain extending from a point in advance of the stroke path of the plunger to the other side to carry boxes away, both said chains comprising box engaging lugs, and a stop movable into, and out of, the path of boxes moving on said conveyor chain; means for operating said stop in timed relationship with said plunger; and means operable at the end of the plunger stroke for projecting the bottom member of the plunger beyond the body member into a position sufficiently close to said conveyor to strip the formed liner off the plunger and seat it in the respective folding box body.

8. A structural unit for use in a machine for forming liner blanks into box-like form and inserting such formed liners into the bodies of assembled folding boxes, said unit comprising, a folding die and a plunger movable through said folding die to fold liner blanks into box-like form, said die comprising side wall members and end wall members forming a substantially rectangular throat with the side wall members, said plunger comprising a body member, a separate bottom member movable relatively to the bottom member, spring means for urging said bottom member into a retracted position with respect to the body member, and a double armed lever for moving said bottom member into projected position against the action of said spring means, said lever being hingedly connected to said bottom member, one end of said lever having an engagement point for engaging said die to tilt said lever by said engagement to project said bottom plate at the end of the movement of the plunger into said die.

References Cited in the file of this patent
UNITED STATES PATENTS

| | | |
|---|---|---|
| 2,580,189 | Pagendarm | Dec. 25, 1951 |
| 2,643,592 | Geffroy | June 30, 1953 |
| 2,655,843 | Baker et al. | Oct. 20, 1953 |

FOREIGN PATENTS

| | | |
|---|---|---|
| 151,828 | Australia | Dec. 10, 1937 |

UNITED STATES PATENT OFFICE

CERTIFICATE OF CORRECTION

Patent No. 2,837,014 June 3, 1958

Thomas Francis Burke

It is hereby certified that error appears in the printed specification of the above numbered patent requiring correction and that the said Letters Patent should read as corrected below.

Column 4, line 20, for "moves" read -- move --; column 10, line 17, for "bottom" read -- body --.

Signed and sealed this 18th day of November 1958.

(SEAL)
Attest:

KARL H. AXLINE
Attesting Officer

ROBERT C. WATSON
Commissioner of Patents